US009437863B2

United States Patent
Xiao et al.

(10) Patent No.: US 9,437,863 B2
(45) Date of Patent: Sep. 6, 2016

(54) SURFACE COATING METHOD AND A METHOD FOR REDUCING IRREVERSIBLE CAPACITY LOSS OF A LITHIUM RICH TRANSITIONAL OXIDE ELECTRODE

(71) Applicant: GM Global Technology Operations LLC, Detroit, MI (US)

(72) Inventors: Qiangfeng Xiao, Sterling Heights, MI (US); Mei Cai, Bloomfield Hills, MI (US)

(73) Assignee: GM Global Technologies Operations LLC, Detroit, MI (US)

( * ) Notice: Subject to any disclaimer, the term of this patent is extended or adjusted under 35 U.S.C. 154(b) by 700 days.

(21) Appl. No.: 13/785,783

(22) Filed: Mar. 5, 2013

(65) Prior Publication Data
US 2014/0255603 A1 Sep. 11, 2014

(51) Int. Cl.
*B05D 3/02* (2006.01)
*H01M 4/04* (2006.01)
*B05D 3/04* (2006.01)
*H01M 4/1391* (2010.01)
*H01M 4/36* (2006.01)

(52) U.S. Cl.
CPC ......... *H01M 4/0471* (2013.01); *H01M 4/1391* (2013.01); *H01M 4/366* (2013.01); *Y02E 60/122* (2013.01)

(58) Field of Classification Search
CPC . H01M 4/0471; H01M 4/1391; H01M 4/366
USPC ........................................................ 427/213.3
See application file for complete search history.

(56) References Cited

U.S. PATENT DOCUMENTS

| 5,707,756 A * | 1/1998 | Inoue ................. H01M 2/1235 429/57 |
| 6,291,392 B2 * | 9/2001 | Hesse .......................... 502/234 |
| 2009/0104428 A1 * | 4/2009 | Chung ................. H01G 9/2031 428/318.6 |

OTHER PUBLICATIONS

Park, Kyu-Sung, et al. "Suppression of O2 evolution from oxide cathode for lithium-ion batteries: VOx-impregnated 0.5Li2MnO3—0.5LiNi0.4Coo.2Mn0.4O2 cathode", Chem. Communications 2010, 46, 4190-4192 and Supplementary Material (ESI) for Chemical Communications.*

Wang, Q.Y., et al. "High capacity double-layer surface modified Li[Li0.2Mn0.54Ni0.i3Coo.i3]O2 cathode with improved rate capability", Journal of Materials Chemistry, 2009, 19, 4965-4972.*

(Continued)

*Primary Examiner* — Alexander Weddle
(74) *Attorney, Agent, or Firm* — Dierker & Kavanaugh, P.C.

(57) ABSTRACT

A surface coating method and a method for reducing irreversible capacity loss of a lithium rich transitional oxide electrode are disclosed herein. In an example of the surface coating method, a dispersion of a lithium rich transitional oxide powder and an oxide precursor or a phosphate precursor in a liquid is formed. The liquid is evaporated. The forming and evaporating steps are carried out in the absence of air to prevent precipitation of the oxide precursor or the phosphate precursor. Hydrolyzation of the oxide precursor or the phosphate precursor is controlled under predetermined conditions, and an intermediate product is formed. The intermediate product is annealed to form an oxide coated lithium rich transitional oxide powder or the phosphate coated lithium rich transitional oxide powder.

20 Claims, 5 Drawing Sheets

(56) References Cited

OTHER PUBLICATIONS

Ozer, Nilgun et al. "Electrochemical properties of sol-gel deposited vanadium pentoxide films". Thin Solid Films 305 (1997) 80-87.*

Park, Kyu-Sung, et al. "Suppression of $O_2$ evolution from oxide cathode for lithium-ion batteries: $VO_x$-impregnated $0.5Li_2MnO_3$—$0.5LiNi_{0.4}Co_{0.2}Mn_{0.4}O_2$ cathode", Chem. Communications 2010, 46, 4190-4192 and Supplementary Material (ESI) for Chemical Communications, This journal is (c) The Royal Society of Chemistry, 2010, 7 pages.

Wang, Q.Y., et al. "High capacity double-layer surface modified $Li[Li_{0.2}Mn_{0.54}Ni_{0.13}Co_{0.13}]O_2$ cathode with improved rate capability", Journal of Materials Chemistry, 2009, 19, 4965-4972.

Gao, J., et al., "High capacity $Li[Li_{0.2}Mn_{0.54}Ni_{0.13}Co_{0.13}]O_2$—$V_2O_5$ composite cathodes with low irreversible capacity loss for lithium ion batteries", Electrochemistry Communications 11, 2009, 84-86.

* cited by examiner

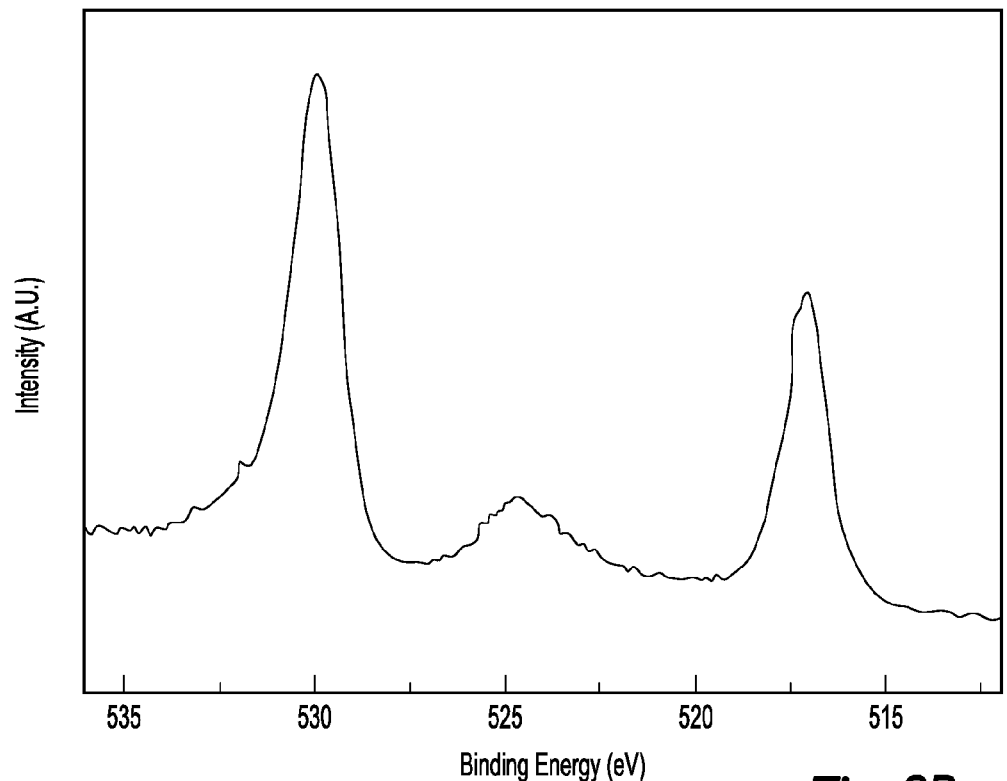
*Fig-2B*
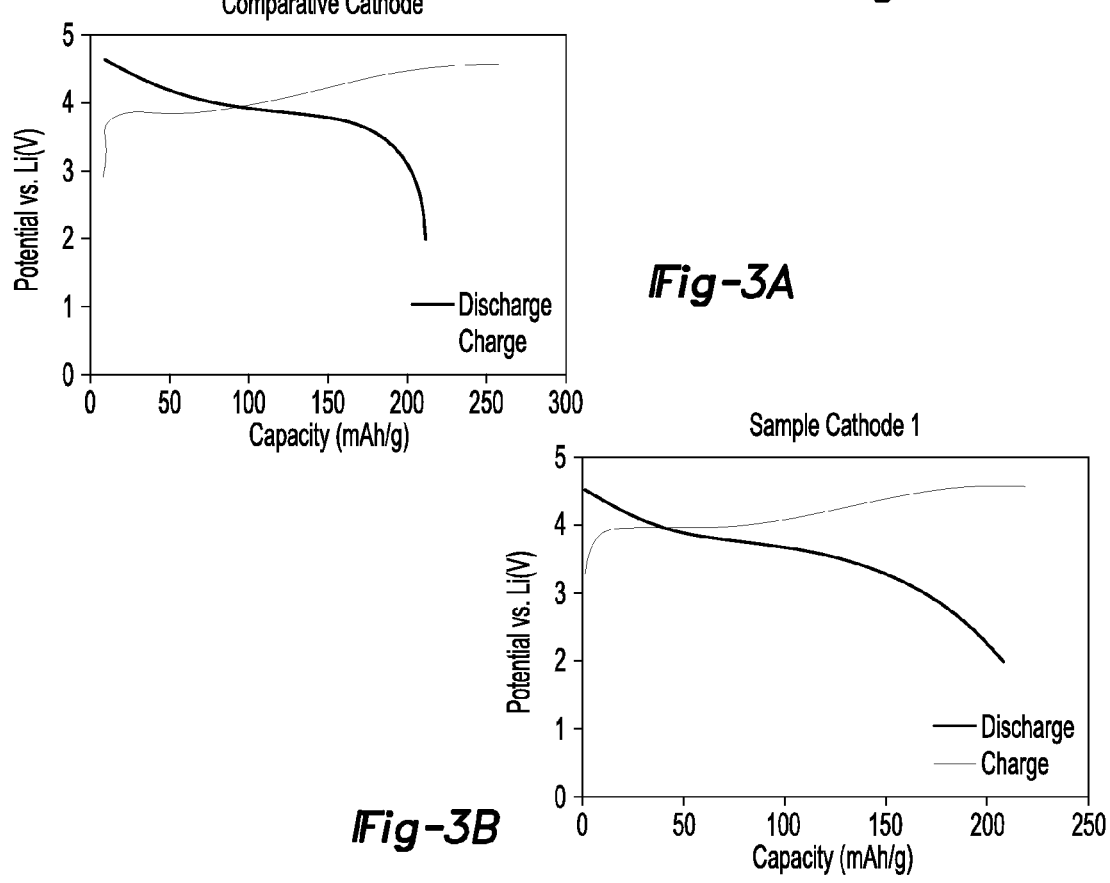
*Fig-3A*
*Fig-3B*

SURFACE COATING METHOD AND A METHOD FOR REDUCING IRREVERSIBLE CAPACITY LOSS OF A LITHIUM RICH TRANSITIONAL OXIDE ELECTRODE

BACKGROUND

Secondary, or rechargeable, lithium ion batteries are used in many stationary and portable devices, such as those encountered in the consumer electronic, automobile, and aerospace industries. The lithium ion class of batteries has gained popularity for various reasons, including a relatively high energy density, a general nonappearance of any memory effect when compared to other kinds of rechargeable batteries, a relatively low internal resistance, and a low self-discharge rate when not in use.

A lithium ion battery generally operates by reversibly passing lithium ions between a negative electrode (e.g., anode) and a positive electrode (e.g., cathode). The negative and positive electrodes are situated on opposite sides of a microporous polymer separator that is soaked with an electrolyte solution suitable for conducting lithium ions. Each of the negative and positive electrodes is also accommodated by a current collector. The current collectors associated with the two electrodes are connected by an interruptible external circuit that allows an electric current to pass between the electrodes to electrically balance the related migration of lithium ions. Further, the negative electrode may include a lithium intercalation host material, and the positive electrode may include a lithium-based active material that can store lithium ions at a higher electric potential than the intercalation host material of the negative electrode. The electrolyte solution may contain a lithium salt dissolved in a non-aqueous solvent.

A lithium ion battery, or a plurality of lithium ion batteries that are connected in series or in parallel, can be utilized to reversibly supply power to an associated load device. A brief discussion of a single power cycle beginning with battery discharge follows.

At the beginning of a discharge, the negative electrode of a lithium ion battery contains a high concentration of intercalated lithium while the positive electrode is relatively depleted. The establishment of a closed external circuit between the negative and positive electrodes under such circumstances causes the extraction of intercalated lithium from the negative anode. The extracted lithium atoms are split into lithium ions and electrons as they leave an intercalation host at the electrode-electrolyte interface. The lithium ions are carried through the micropores of the interjacent polymer separator from the negative electrode to the positive electrode by the ionically conductive electrolyte solution while, at the same time, the electrons are transmitted through the external circuit from the negative electrode to the positive electrode (with the help of the current collectors) to balance the overall electrochemical cell. This flow of electrons through the external circuit can be harnessed and fed to a load device until the level of intercalated lithium in the negative electrode falls below a workable level or the need for power ceases.

The lithium ion battery may be recharged after a partial or full discharge of its available capacity. To charge or re-power the lithium ion battery, an external power source is connected to the positive and the negative electrodes to drive the reverse of battery discharge electrochemical reactions. That is, during charging, the external power source extracts the lithium present in the positive electrode to produce lithium ions and electrons. The lithium ions are carried back through the separator by the electrolyte solution, and the electrons are driven back through the external circuit, both towards the negative electrode. The lithium ions and electrons are ultimately reunited at the negative electrode, thus replenishing it with intercalated lithium for future battery discharge.

SUMMARY

A surface coating method and a method for reducing irreversible capacity loss of a lithium rich transitional oxide electrode are disclosed herein. In an example of the surface coating method, a dispersion of a lithium rich transitional oxide powder and an oxide precursor or a phosphate precursor in a liquid is formed. The liquid is evaporated. The forming and evaporating steps are carried out in the absence of air to prevent precipitation of the oxide precursor or the phosphate precursor. Hydrolyzation of the oxide precursor or the phosphate precursor is controlled under predetermined conditions, and an intermediate product is formed. The intermediate product is annealed to form an oxide coated lithium rich transitional oxide powder or a phosphate coated lithium rich transitional oxide powder.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 2B is an enlarged portion of FIG. 2A showing the vanadium core level binding spectra of Sample 2;

FIGS. 3A, 3B, 3C, and 3D are charge/discharge profiles in the first cycle for a Comparative Cathode (made with the Comparative Sample) and the Sample Cathodes 1, 2, and 3 (respectively made with Samples 1, 2, and 3);

DETAILED DESCRIPTION

Figure 1:
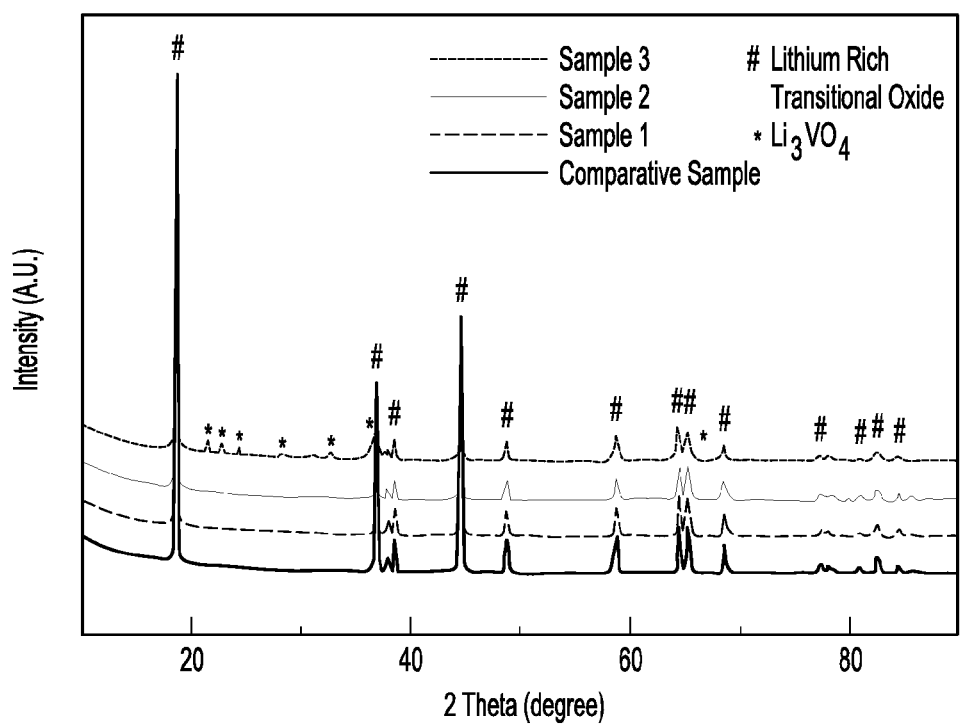
FIG. 1 illustrates the X-ray diffraction patterns of a Comparative Sample (uncoated lithium rich transitional oxide powder) and Samples 1, 2 and 3 (vanadium oxide coated lithium rich transitional oxide powder with a weight ratio of $V_2O_5$:powder=15:100 and annealed at different temperatures)

The ability of lithium ion batteries to undergo repeated power cycling over their useful lifetimes makes them an attractive and dependable power source. It is desirable for these batteries to have a high discharge capacity and an extended life. Some cathode materials, such as layered $Li_2MnO_3$ and $LiMO_2$ (where M=Mn, Ni, or Co), exhibit a discharge capacity of greater than or equal to 250 mAh/g, which is desirable for a lithium ion battery. However, it has been found that these cathode materials may also exhibit a large irreversible capacity loss in the first cycle due, at least in part, to the extraction of $LiO_2$, which results in a lower number of lithium ion sites in subsequent cycles.

The method(s) disclosed herein create a surface coating on the electrode material (e.g., the cathode material mentioned above) that improves the electrochemical performance (e.g., coulombic efficiency, cycleability, etc.) of the electrode material. The irreversible capacity loss exhibited by the coated electrode material is also reduced. It is believed that the surface coating provides a lithium ion free host that can accommodate lithium ions during charge/discharge cycles. It is also believed that the surface coating may decrease side reactions within a lithium ion battery by preventing direct contact of the lithium rich transitional oxide cathode materials and the electrolyte solution.

Examples of the wet-chemistry method(s) disclosed herein form tunable compositions utilizing controllable conditions. For example, the material, temperature, environment, etc. used throughout the method(s) may be controlled in order to achieve a desired amorphous surface coating.

An example of the method disclosed herein resembles a sol-gel process, which is a wet-chemical technique that starts with a dispersion, namely a diphasic system containing both a liquid phase and a solid phase, which is ultimately converted to a solid phase using annealing.

The method begins with forming a dispersion of a lithium rich transitional oxide powder and an oxide or phosphate precursor in a liquid. In an example, the lithium rich transitional oxide powder is added to the liquid while exposed to magnetic stirring to form an initial dispersion, and then the oxide precursor or the phosphate precursor is added to the initial dispersion to form the final dispersion. The order of adding the powder and then adding the precursor is believed to result in a more uniform dispersion, and ultimately, a more uniform coating.

The amount of oxide or phosphate precursor and lithium rich transitional oxide powder used in the dispersion depends, at least in part, on the desired weight ratio of oxide or phosphate coating to powder in the final product. The amounts selected ultimately create a coated powder material having a weight ratio of oxide coating or phosphate coating to lithium rich transitional oxide powder ranging from about 10:100 to about 20:100. In one specific example, about 0.08 grams of the precursor and about 0.2 grams of the powder may be included in the dispersion that is used to create the coated powder material having the weight ratio of about 15:100 oxide or phosphate coating to lithium rich transitional oxide powder. It is to be understood that this is one example, and that the amounts of the respective materials included in the dispersion may vary depending upon the desired weight ratio for the coated powder material that is to be formed. As an example, any amount of lithium rich transitional oxide powder may be used, and the amount of precursor may be tuned based upon the desired weight ratio and the amount of lithium rich transitional oxide powder.

One example of the lithium rich transitional oxide powder has the formula $xLi_2MnO_3-(1-x)LiMO_2$, where $0 \leq x \leq 1$, and where M=Ni, Co or Mn.

Examples of suitable oxide precursors include a vanadium oxide precursor (e.g., triisopropoxyvanadium (V) oxide), a titanium oxide precursor (e.g., titanium (IV) isopropoxide), a zirconium oxide precursor (e.g., zirconium (IV) butoxide), an aluminum oxide precursor (e.g., aluminum ethoxide), a zinc oxide precursor (e.g., zinc methoxide), a niobium oxide precursor (e.g., niobium (V) ethoxide), a tungsten oxide precursor (tungsten (IV) isopropoxide), a silicon dioxide precursor (e.g., tetraethoxysilane), and combinations thereof. Examples of suitable phosphate precursors include a titanium phosphate precursor, an aluminum phosphate precursor, or a cobalt phosphate precursor. An example of the titanium phosphate precursor is $PO(OH)_{3-x}(OR)_x$, obtained from $P_2O_5$ and ethanol or n-butanol and alkoxides of titanium. An example of the aluminum phosphate precursor is $AlNO_3 \cdot 9H_2O$ and $(NH_4)_2HPO_4$. An example of the cobalt phosphate precursor is $Co(NO_3)_2 \cdot 6H_2O$ and $(NH_4)_2HPO_4$.

Any liquid that is capable of dissolving the precursor and dispersing the powder may be used. Examples of the liquid are ethanol and tetrahydrofuran (THF). The amount of liquid used is sufficient to form the dispersion. In an example, about 1 mL of liquid is used for about 0.3 grams total of precursor and powder.

After the dispersion is formed, the liquid is evaporated. Evaporation may be initiated and performed by opening the reactor (e.g., the vial, beaker, etc.) inside of the glove box or other closed environment.

Both dispersion formation and liquid evaporation may be carried out in the absence of air. This is desirable so that the oxide precursor or the phosphate precursor does not precipitate or form precipitation, which may otherwise occur upon exposure to air. In an example, the dispersion formation and the liquid evaporation may be performed in a glove box in the presence of argon gas. It is to be understood that other sealed containers and other inert gases may be used to perform dispersion formation and liquid evaporation in the absence of air.

After evaporation of the liquid from the dispersion, the remaining mixture of the lithium rich transitional oxide powder and the oxide or phosphate precursor is exposed to a controlled hydrolysis process. The controlled hydrolysis process results in the hydrolyzation of the oxide precursor or the phosphate precursor to form an intermediate product. More particularly, when hydrolysis is performed slowly, any organic species from the oxide precursor or the phosphate precursor is removed. When the organic species is gone, the intermediate product is formed, which is a precursor to a corresponding oxide (of the oxide precursor) or phosphate (of the phosphate precursor). In an example, the slow hydrolysis is performed over a period of 24 hours.

The controlled hydrolyzation of the precursor is carried out in and/or under predetermined conditions that lead to the formation of the intermediate product, which ultimately forms the desired oxide or phosphate after annealing. In an example, the mixture of the lithium rich transitional oxide powder and the oxide or phosphate precursor is exposed to water vapor at a particular temperature, for a particular time, and in a particular environment. In an example, the controlled hydrolysis conditions include the temperature ranging from about 50° C. to about 80° C., the time ranging from about 24 hours to about 48 hours, and the environment being sealed from air. The temperature and time may vary, depending upon the type and nature of the precursor used. The sealed environment may be any sealed container that is filled with an inert gas (e.g., the argon filled glove box). The air-free environment assists in ensuring that hydrolysis takes place by preventing the formation of precipitation from the precursor that may otherwise occur upon exposure to air (as described above).

After performing hydrolysis, an example of the method involves annealing the intermediate product to form the oxide coated or phosphate coated lithium rich transitional oxide powder Annealing is used to solidify the oxide coating or phosphate coating on the surface of the lithium rich transitional oxide powder Annealing may be controlled to obtain a desirable morphology (e.g., amorphous or crystalline) of the coating. Annealing may also be controlled to obtain a desirable phase of the oxide or phosphate. As such, the annealing temperature may vary depending, at least in part, upon the oxide precursor or phosphate precursor that is used and the desirable form of the coating. In an example, an amorphous coating is more desirable because it binds with the surface of the powder better than a crystalline coating.

The mixture that is exposed to annealing does not include any additional binders, and thus annealing temperatures are not limited by binders having a low temperature tolerance.

The following examples are suitable annealing temperature ranges for different oxide precursors. When the vanadium oxide precursor is used and an amorphous vanadium oxide coating is desired, the annealing temperature may range from about 100° C. to about 300° C. If a crystalline form of the vanadium oxide coating ($Li_3VO_4$) is desired, the annealing temperature may be increased up to about 500° C. When either the titanium oxide precursor or the zirconium oxide precursor is used, the annealing temperature may range from about 100° C. to about 400° C. The annealing temperature may range from about 100° C. to about 350° C. when the aluminum oxide precursor is used. When the zinc oxide precursor is used, annealing may be accomplished at a temperature of less than 90° C. The annealing temperature may range from about 100° C. to about 700° C. when the niobium oxide precursor is used, and the annealing temperature may range from about 100° C. to about 200° C. when the tungsten oxide precursor is used. When the silicon dioxide precursor is used, annealing may be accomplished at a temperature ranging from about 100° C. to about 500° C. It is believed that these example temperature ranges will result in an amorphous coating.

The following examples are suitable annealing temperature ranges for different phosphate precursors Annealing may be performed at around 400° C. when aluminum or cobalt phosphates are used, and annealing may be performed at around 700° C. when titanium phosphates are used.

The material resulting from the method(s) disclosed herein is the oxide coated lithium rich transitional oxide powder or the phosphate coated lithium rich transitional oxide powder. This material may be used to form a lithium rich transitional oxide electrode. In one example, this electrode is a cathode.

The cathode may be made by mixing the oxide coated lithium rich transitional oxide powder or the phosphate coated lithium rich transitional oxide powder with a conductive carbon black material (e.g., Super-P, KS-6, carbon nanotubes, etc.) and a binder (e.g., polytetrafluoroethylene (PTFE), polyvinylidene fluoride (PVDF)) to form a mixture. In an example, the mixture includes a weight ratio of the oxide coated lithium rich transitional oxide powder or the phosphate coated lithium rich transitional oxide powder: conductive carbon black material:binder ranging from 8:1:1 to 75:25:5. This mixture may be made into a slurry by adding drops of a liquid, such as isopropanol. The slurry may be spread in the form of a sheet. The slurry (in sheet form) may then be punched and dried to form the desired electrode. In an example, punching and drying occurs at about 100° C. for about 4 hours under vacuum. These conditions effectively remove moisture from the formed electrodes.

To further illustrate the present disclosure, examples are given herein. It is to be understood that these examples are provided for illustrative purposes and are not to be construed as limiting the scope of the disclosed example(s).

EXAMPLE

Forming Oxide Coated Lithium Rich Transitional Oxide Powder

A lithium rich transitional oxide powder was used. About 0.2 g of powder was dispersed in 1 mL THF in a 20 mL vial. About 0.08 g of triisopropoxyvanadium(V) oxide was added to the dispersion under magnetic stirring. The THF was then evaporated from the dispersion. Each of these steps was carried out in a glove box to prevent the precipitation of triisopropoxyvanadium(V) oxide when exposed to air. After evaporation, the 20 mL vial was transferred into a 200 mL sealed vial containing 5 mL $H_2O$. The hydrolyzation of triisopropoxyvanadium(V) oxide was achieved using $H_2O$ vapor produced at 60° C. Portions of the sample were annealed at different temperatures, including Sample 1 at 120° C., Sample 2 at 300° C., and Sample 3 at 500° C. The final coated powders had a weight ratio of $V_2O_5$ to lithium rich transitional oxide powder of 15:100.

Samples 4 and 5 were prepared in a similar manner to Sample 2 (i.e., annealing at 300° C.), except that the weight ratio of the $V_2O_5$ coating to lithium rich transitional oxide powder was tuned to 5:100 (Sample 4) and 25:100 (Sample 5). As such, for Sample 4, about 0.2 g of powder and about 0.027 g of triisopropoxyvanadium(V) oxide was used; and for Sample 5, about 0.2 g of powder and about 0.13 g of triisopropoxyvanadium(V) oxide was used.

Uncoated lithium rich transitional oxide powder (as it was received) was used as a Comparative Sample.

Forming Electrodes and Coin Cells

A coin-cell (CR2016) was used to examine the electrochemical performance of the coated samples (i.e., Samples 1, 2, 3, 4 and 5).

Cathodes were made by respectively mixing each of the Samples 1, 2, 3, 4 and 5 with Super-P and PTFE binder at a weight ratio of 75:25:5. These cathodes are referred to herein, respectively, as Sample Cathodes 1, 2, 3, 4 and 5. A Comparative Cathode was made by mixing the uncoated Comparative Sample with Super-P and PTFE binder at a weight ratio of 75:25:5. The respective mixtures were thoroughly ground into respective slurries by adding drops of isopropanol. These slurries were spread in the form of respective sheets, followed by punching of cathodes and drying at 100° C. for 4 hours under vacuum to remove moisture.

The coin cells (composed of an aluminum mesh current collector, one of the Sample cathodes or Comparative Sample cathodes, a microporous polyethylene separator, and a lithium anode) were assembled in an argon-filled glove box. The electrolyte was a 1.0M $LiPF_6$ solution in ethylene carbonate/diethyl carbonate (EC/DEC) (1/1 vol. %). Galvanostatic charge and discharge cycle tests were carried out at 30° C. between 2.0 and 4.6 V.

Characterization

Transmission electron microscopy (TEM), scanning TEM images and energy dispersive X-ray spectroscopy (EDS) were taken on JEOL JEM 2100F at 200 kV. X-ray diffraction (XRD) patterns were obtained on Bruker D8 Advance with Cu Kα radiation (λ=1.5418 Å). The composition analysis was carried out using both EDS and inductively coupled plasma optical emission spectroscopy (ICP-OES) on Varian 725-ES. X-ray photoelectron spectroscopy (XPS) spectra were collected with a PHI 3057 spectrometer using Mg Kα X-ray at 1286.6 eV and Al Kα radiations at 1486.6.

Results

FIG. 1 illustrates the X-ray diffraction patterns of the Comparative Sample and Samples 1, 2 and 3, where the # symbol is indicative of peaks associated with lithium rich transitional oxide and the * symbol is indicative of peaks/valleys associated with $Li_3VO_4$. The X-ray diffraction pattern of the Comparative Sample exhibits layered structures. Samples 1 and 2 (both of which were annealed at or below 300° C.) displayed similar patterns as the Comparative Sample, indicating the amorphous properties or low crystallinity of $V_2O_5$. The X-ray diffraction pattern for Sample 3, which was annealed at the higher temperature (500° C.), illustrates a new crystalline phase, namely $Li_3VO_4$.

Figure 2A:
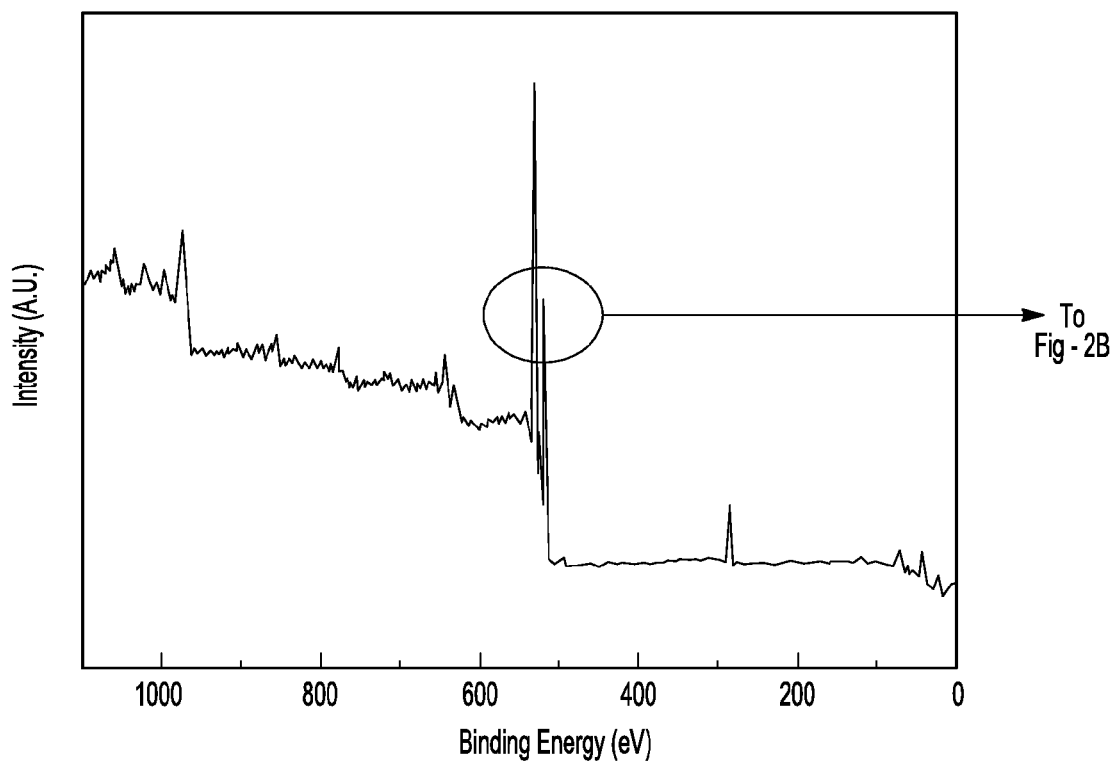
FIG. 2A is the XPS survey scan spectra of Sample 2.

FIG. 2A is the XPS survey scan spectra of Sample 2 (annealed at 300° C.), and FIG. 2B is an enlarged portion of FIG. 2A showing the vanadium core level binding spectra of Sample 2. A comparison of these results with a standard spectra indicated that Sample 2 included $V_2O_5$. In particular, the binding energy shown in FIG. 2B was consistent with $V_2O_5$. The two peaks of vanadium (shown in FIG. 2B) correspond to a doublet V2p3/2 (~517.48 eV) and V2p1/2 (~524.82 eV). The main oxygen peak (530.36 eV) was found, as to be expected for vanadium bonded oxygen. Compared to Mn, Ni and Co, V showed much stronger intensity, which indicated that the lithium rich transitional oxide powder of Sample 2 was mostly coated by $V_2O_5$.

Transmission electron microscopy (TEM) images of Samples 1, 2 and 3 were taken. While these images are not shown herein, the morphology of Samples 1, 2 and 3 was investigated using these images. There existed an obvious boundary for Samples 1 and 2. The boundary became blurred for Sample 3.

To intuitively illustrate the distribution of the $V_2O_5$ coating, a high-angle annular dark-field scanning transmission electron microscopy (HAADF-STEM) image and its corresponding V, Mn, Ni and Co elemental maps along with a representative energy-dispersive X-ray (EDX) analysis were carried out for Samples 2 and 3. For Sample 2, V was mainly distributed on the surface, while Mn, Ni and Co was located inside the particles. These results are consistent with those of XPS. For Sample 3, the clear boundary between V and Mn, Co, Ni disappeared. The high annealing facilitated the diffusion of $V_2O_5$ among the inter-particles and extracted $Li^+$ from the lithium rich transitional oxide powder to form $Li_3VO_4$. It is believed that the formation of $Li_3VO_4$ may arise from the difficulty of interdiffusion between V, Mn, Ni, and Co.

The TEM and STEM results indicated that the annealing temperature may be controlled to obtain a desirable morphology and phase of the vanadium oxide.

The charge/discharge profiles in the first cycle (FIGS. 3A through 3D) and rate capability (FIGS. 4A through 4D) of the Comparative Cathode (FIGS. 3A, 4A) and Sample Cathodes 1 (FIGS. 3B, 4B), 2 (FIGS. 3C, 4C), and 3 (FIGS. 3D, 4D) were compared. The mass for capacity calculation was based on the lithium rich transitional oxide powder plus the $V_2O_5$ coating. The charge/discharge results were obtained at the rate of 0.1 C.

Figure 3C:
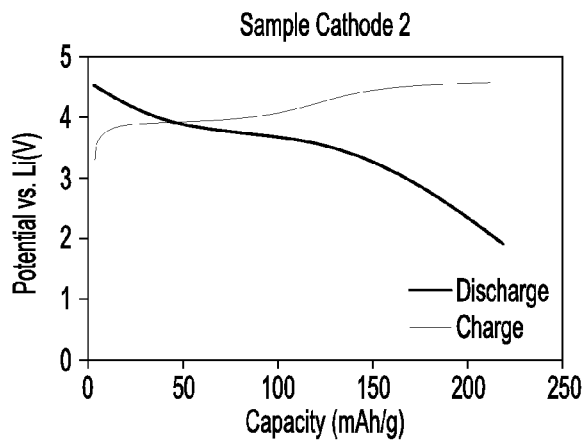
Figure 3D:
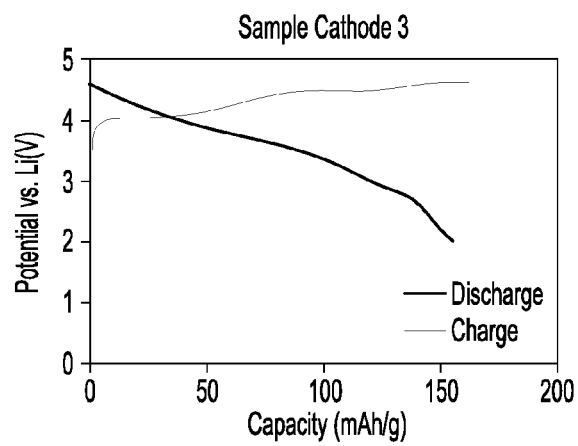

As shown when comparing FIG. 3A with FIGS. 3C and 3D, Sample Cathodes 1 and 2 exhibited lower charge capacity and higher discharge capacity than the Comparative Cathode. Irreversibility results from the elimination of oxide ion vacancies concomitant with the lost lithium ion sites at the end of first charging process. The decrease in irreversibility of Samples 1 and 2 may be attributed to the accommodation of lithium ions in the lithium free $V_2O_5$ host. The surface coatings disclosed herein also prevent the direct contact of the lithium rich transitional oxide powder with the electrolyte, thereby mitigating the dissolution of Mn ions.

As shown in FIG. 3D, both the charge and discharge capacity of Sample 3 decreased due to the formation of $Li_3VO_4$.

Figure 4A:
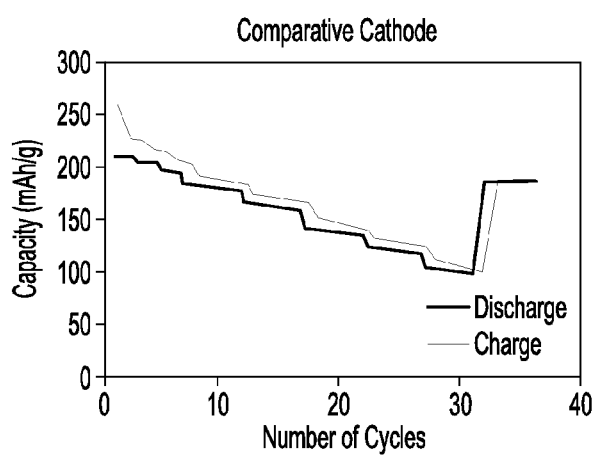
FIGS. 4A, 4B, 4C, and 4D are rate capability graphs for the Comparative Cathode and the Sample Cathodes 1, 2, and 3 (noting that the first six cycles are formation steps at the rate of 0.1 C ($1^{st}$ and $2^{nd}$), 0.2 C ($3^{rd}$ and $4^{th}$) and 0.33 C ($5^{th}$ and $6^{th}$))
Figure 4B:
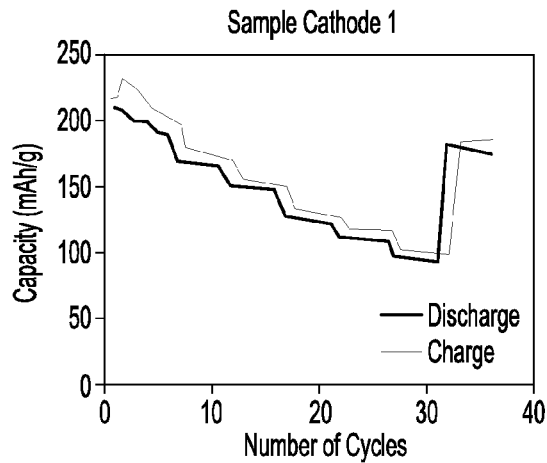
Figure 4C:
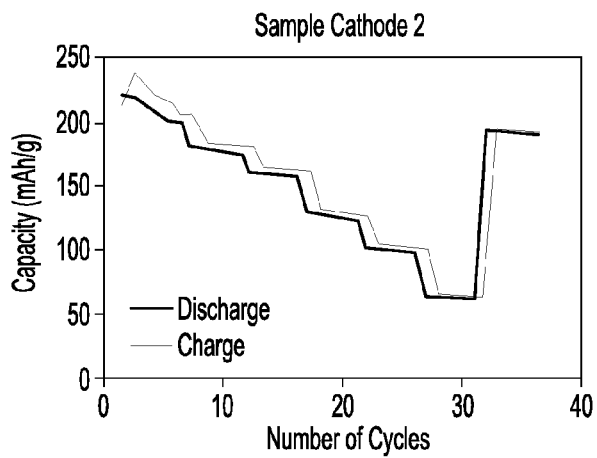
Figure 4D:
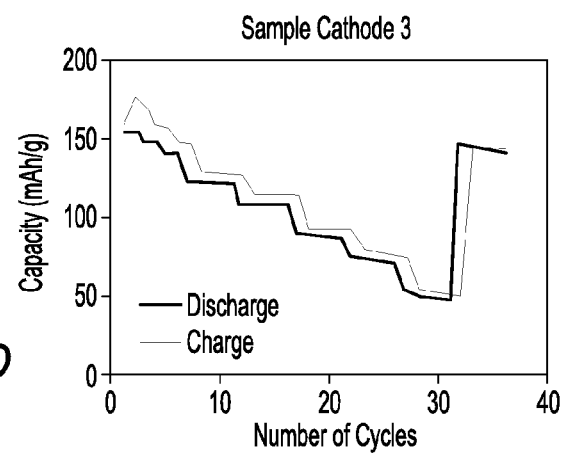

A comparison of FIG. 4A with each of FIGS. 4B and 4C illustrates that there was no significant improvement in the rate capability observed for the coated cathodes (Sample Cathodes 1 and 2) against the Comparative Cathode.

Figure 5A:
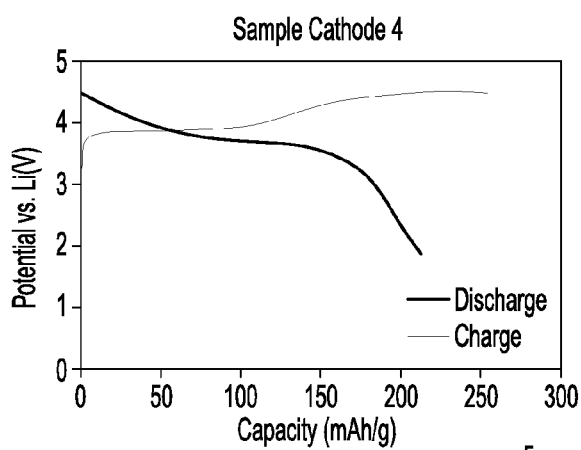
FIGS. 5A and 5B are charge/discharge profiles in the first cycle for Sample Cathode 4 (made with Sample 4—vanadium oxide coated lithium rich transitional oxide powder with a weight ratio of $V_2O_5$:powder=5:100 and annealed at 300° C.) and the Sample Cathode 5 (made with Sample 5—vanadium oxide coated lithium rich transitional oxide powder with a weight ratio of $V_2O_5$:powder=25:100 and annealed at 300° C.)
Figure 5B:
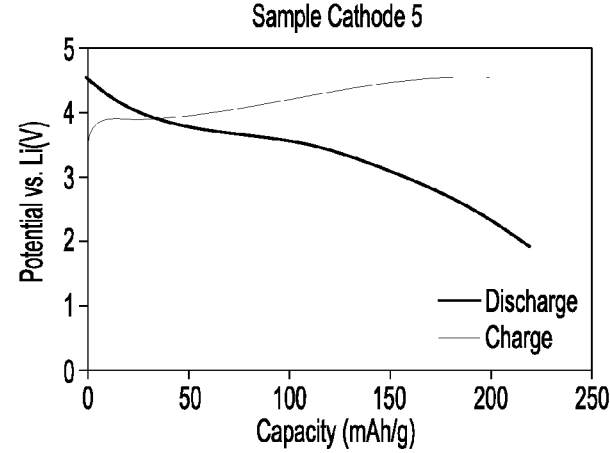
Figure 6A:
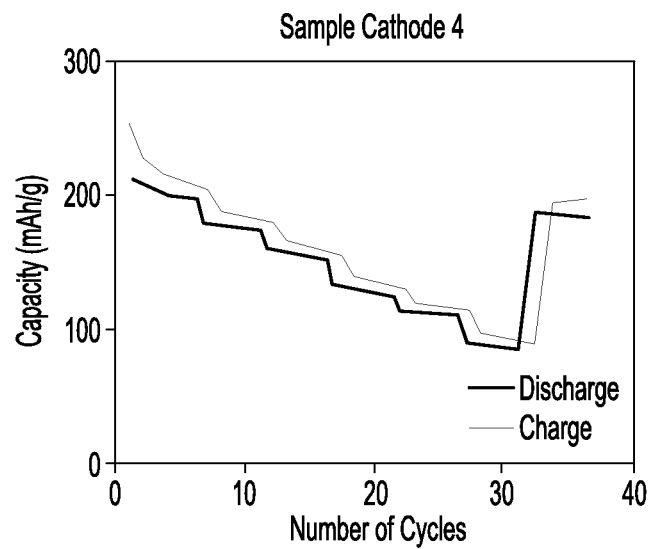
FIGS. 6A and 6B are rate capability graphs for the Sample Cathodes 4 and 5 (noting that the first six cycles are formation steps at the rate of 0.1 C ($1^{st}$ and $2^{nd}$), 0.2 C ($3^{rd}$ and $4^{th}$) and 0.33 C ($5^{th}$ and $6^{th}$)).
Figure 6B:
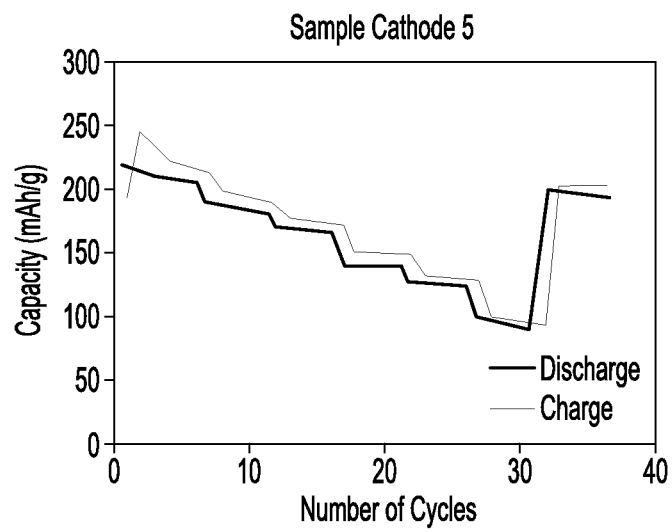

The charge/discharge profiles in the first cycle (FIGS. 5A and 5B) and rate capability (FIGS. 6A and 6B) of Sample Cathodes 4 (FIGS. 5A, 6A) and 5 (FIGS. 5B, 6B) were also examined. As illustrated in FIG. 5A, when the weight ratio of $V_2O_5$:lithium rich transitional oxide powder is 5:100, the irreversibility loss in the first charge/discharge slightly decreases (as compared to the Comparative Cathode, see FIG. 3A). As illustrated in FIG. 5B, when the weight ratio increases to 25:100, the discharge capacity exceeds the charge capacity. For Sample Cathode 5, it appeared that the $V_2O_5$ coating served as a barrier which retained some lithium ions at the end of the charging process.

As illustrated by this Example, $V_2O_5$ has been successfully coated onto lithium rich transitional oxide powders through the method disclosed herein. Also as illustrated, the annealing temperature may be tuned in order to control the desired morphology and phase of the oxide coating. Samples 2 and 3 and Sample Cathodes 2 and 3 illustrated that irreversible capacity loss can be significantly reduced by the accommodation of lithium ions in a lithium free host.

It is to be understood that the ranges provided herein include the stated range and any value or sub-range within the stated range. For example, a range from about 100° C. to about 300° C. should be interpreted to include not only the explicitly recited limits of about 100° C. to about 300° C., but also to include individual values, such as 125° C., 202° C., 250° C., etc., and sub-ranges, such as from about 175° C. to about 295° C.; from about 150° C. to about 250° C., etc. Furthermore, when "about" is utilized to describe a value, this is meant to encompass minor variations (up to +/−5%) from the stated value.

In describing and claiming the examples disclosed herein, the singular forms "a", "an", and "the" include plural referents unless the context clearly dictates otherwise.

While several examples have been described in detail, it will be apparent to those skilled in the art that the disclosed examples may be modified. Therefore, the foregoing description is to be considered non-limiting.

The invention claimed is:

1. A surface coating method, comprising:
   forming a dispersion of a lithium rich transitional oxide powder and an oxide precursor or a phosphate precursor in a liquid;
   evaporating the liquid;
   carrying out the forming and the evaporating steps in the absence of air to prevent precipitation of the oxide precursor or the phosphate precursor;
   controlling hydrolyzation of the oxide precursor or the phosphate precursor under predetermined conditions, thereby forming an intermediate product; and annealing the intermediate product to form an oxide coated lithium rich transitional oxide powder or a phosphate coated lithium rich transitional oxide powder.

2. The surface coating method as defined in claim 1 wherein the lithium rich transitional oxide powder is $xLi_2MnO_3$-$(1-x)LiMO_2$, where $0 \leq x \leq 1$, and M=Ni, Co or Mn.

3. The surface coating method as defined in claim 1 wherein:
the oxide precursor is selected from the group consisting of a vanadium oxide precursor, a titanium oxide precursor, a zirconium oxide precursor, an aluminum oxide precursor, a zinc oxide precursor, a niobium oxide precursor, a tungsten oxide precursor, and a silicon dioxide precursor; or
the phosphate precursor is selected from the group consisting of an aluminum phosphate precursor, a cobalt phosphate precursor, and a titanium phosphate precursor.

4. The surface coating method as defined in claim 3 wherein the oxide precursor is triisopropoxyvanadium(V) oxide.

5. The surface coating method as defined in claim 4 wherein annealing is accomplished at a temperature ranging from about 100° C. to about 300° C.

6. The surface coating method as defined in claim 3 wherein:
the titanium oxide precursor is used, and annealing is accomplished at a temperature ranging from about 100° C. to about 400° C.;
the zirconium oxide precursor is used, and annealing is accomplished at a temperature ranging from about 100° C. to about 400° C.;
the aluminum oxide precursor is used, and annealing is accomplished at a temperature ranging from about 100° C. to about 350° C.;
the zinc oxide precursor is used, and annealing is accomplished at a temperature of less than 90° C.;
the niobium oxide precursor is used, and annealing is accomplished at a temperature ranging from about 100° C. to about 700° C.;
the tungsten oxide precursor is used, and annealing is accomplished at a temperature ranging from about 100° C. to about 200° C.; or
the silicon dioxide precursor is used, and annealing is accomplished at a temperature ranging from about 100° C. to about 500° C.

7. The surface coating method as defined in claim 3 wherein:
the aluminum phosphate precursor is used, and annealing is accomplished at a temperature of about 400° C.; or
the cobalt phosphate precursor is used, and annealing is accomplished at a temperature of about 400° C.

8. The surface coating method as defined in claim 1 wherein controlling hydrolyzation is accomplished by exposing the lithium rich transitional oxide powder and the oxide precursor or the phosphate precursor to water vapor, and wherein the predetermined conditions include:
an air-free sealed environment; and
a temperature ranging from about 50° C. to about 80° C.

9. The surface coating method as defined in claim 1 wherein forming the dispersion includes:
adding the lithium rich transitional oxide powder to the liquid to form an initial dispersion; and
adding the oxide precursor or the phosphate precursor to the initial dispersion.

10. The surface coating method as defined in claim 1 wherein a weight ratio of oxide coating or phosphate coating to the lithium rich transitional oxide powder ranges from about 10:100 to about 20:100.

11. The surface coating method as defined in claim 1 wherein carrying out the forming and the evaporating steps in the absence of air is accomplished by performing the forming and the evaporating steps in a glove box in the presence of argon gas.

12. A method for reducing irreversible capacity loss of a lithium rich transitional oxide electrode, the method comprising:
forming a dispersion of a lithium rich transitional oxide powder in a liquid;
adding an oxide precursor to the dispersion;
evaporating the liquid from the dispersion;
carrying out the forming, the adding, and the evaporating steps in the absence of air to prevent precipitation of the oxide precursor;
hydrolyzing the oxide precursor in an air-free sealed environment using water vapor at a predetermined temperature, thereby forming an intermediate product;
annealing the intermediate product, thereby forming an oxide coated lithium rich transitional oxide powder; and
using the oxide coated lithium rich transitional oxide powder to form the lithium rich transitional oxide electrode.

13. The method as defined in claim 12 wherein using the oxide coated lithium rich transitional oxide powder to form the lithium rich transitional oxide electrode includes:
mixing the oxide coated lithium rich transitional oxide powder with a conductive carbon black material and a binder to form a mixture;
forming a slurry of the mixture;
spreading the slurry into a sheet form; and
punching and drying the sheet form to generate the lithium rich transitional oxide electrode.

14. The method as defined in claim 13 wherein a ratio of the oxide coated lithium rich transitional oxide powder to the conductive carbon black material to the binder is 75:25:5.

15. The method as defined in claim 12 wherein:
the lithium rich transitional oxide powder is $xLi_2MnO_3$-$(1-x)LiMO_2$, where $0 \leq x \leq 1$, and M=Ni, Co or Mn;
the liquid is tetrahydrofuran; and
the oxide precursor is selected from the group consisting of a vanadium oxide precursor, a titanium oxide precursor, a zirconium oxide precursor, an aluminum oxide precursor, a zinc oxide precursor, a niobium oxide precursor, a tungsten oxide precursor, a silicon dioxide precursor, and combinations thereof.

16. The method as defined in claim 12 wherein the predetermined temperature ranges from about 50° C. to about 80° C.

17. The method as defined in claim 12 wherein a weight ratio of oxide coating to the lithium rich transitional oxide powder ranges from about 10:100 to about 20:100.

18. The method as defined in claim 12 wherein carrying out the forming, the adding, and the evaporating steps in the absence of air is accomplished by performing the forming, the adding, and the evaporating steps in a glove box in the presence of argon gas.

19. A method for reducing irreversible capacity loss of a lithium rich transitional oxide electrode, the method comprising:

forming a dispersion of a lithium rich transitional oxide powder in tetrahydrofuran;

adding triisopropoxyvanadium(V) oxide to the dispersion;

evaporating the tetrahydrofuran from the dispersion;

carrying out the forming, the adding, and the evaporating steps in the absence of air to prevent precipitation of the triisopropoxyvanadium(V) oxide;

hydrolyzing the triisopropoxyvanadium(V) oxide in an air-free sealed environment using water vapor and a temperature ranging from about 50° C. to about 80° C., thereby forming an intermediate product;

annealing the intermediate product, thereby forming a vanadium oxide coated lithium rich transitional oxide powder; and using the vanadium oxide coated lithium rich transitional oxide powder to form the lithium rich transitional oxide electrode.

20. The method as defined in claim 19 wherein using the vanadium oxide coated lithium rich transitional oxide powder to form the lithium rich transitional oxide electrode includes:

mixing the vanadium oxide coated lithium rich transitional oxide powder with a conductive carbon black material and a polytetrafluoroethylene (PTFE) binder to form a mixture;

adding isopropanol to form a slurry of the mixture;

spreading the slurry into a sheet form; and punching and drying the sheet form to generate the lithium rich transitional oxide electrode.

* * * * *